United States Patent [19]
Kim

[11] Patent Number: 6,047,939
[45] Date of Patent: Apr. 11, 2000

[54] ADJUSTABLE SUPPORT STRUCTURE FOR VIDEO APPLIANCE

[75] Inventor: Kyoung Bok Kim, Kyoungsangbuk-Do, Rep. of Korea

[73] Assignee: LG Electronics Inc., Seoul, Rep. of Korea

[21] Appl. No.: 09/112,372

[22] Filed: Jul. 9, 1998

[30] Foreign Application Priority Data

Jul. 9, 1997 [KR] Rep. of Korea ...................... 97-31709

[51] Int. Cl.⁷ .................................................. A16G 29/00
[52] U.S. Cl. ...................... 248/371; 248/349.1; 248/919; 248/920
[58] Field of Search ................................... 248/371, 415, 248/416, 920, 919, 921, 922, 923, 279.1, 349.1, 425

[56] References Cited

U.S. PATENT DOCUMENTS

| | | | |
|---|---|---|---|
| 4,483,503 | 11/1984 | Gahan | 248/349 |
| 4,643,382 | 2/1987 | Ojima et al. | 248/371 |
| 4,648,574 | 3/1987 | Granlund | 248/349 |
| 4,729,533 | 3/1988 | Hillary et al. | 248/184 |
| 4,779,922 | 10/1988 | Cooper | 297/188 |
| 4,946,121 | 8/1990 | Troke | 248/201 |
| 4,946,127 | 8/1990 | Kulaga | 248/551 |
| 4,989,813 | 2/1991 | Kim et al. | 248/183 |
| 5,123,621 | 6/1992 | Gates | 248/281.1 |
| 5,277,392 | 1/1994 | Rossman et al. | 248/231.7 |
| 5,697,588 | 12/1997 | Gonzalez et al. | 248/221.11 |
| 5,704,729 | 1/1998 | Carnahan et al. | 403/322 |

*Primary Examiner*—Ramon O. Ramirez
*Assistant Examiner*—Walter Landry
*Attorney, Agent, or Firm*—Jacobson, Price, Holman & Stern, PLLC

[57] ABSTRACT

An adjustable support structure for a video appliance which enables forward and backward movements in addition to angle adjustment of the appliance in upward, downward, left, and right directions. The support structure includes a supporting plate, a slidable plate attachable to the video appliance, the slidable plate having a lower portion in slidable contact with the supporting plate to allow movement of the slidable plate in forward and backward directions relative to the supporting plate, a rotatable plate, coupled to an upper portion of the slidable plate, for adjusting angles of the video appliance in left, right, upward and downward directions, a connecting part, inserted in the rotatable plate, for connecting the slidable plate to the rotatable plate, and a fastening part for fastening the slidable plate, the rotatable plate, and the connecting part together.

7 Claims, 5 Drawing Sheets

ADJUSTABLE SUPPORT STRUCTURE FOR VIDEO APPLIANCE

BACKGROUND OF THE INVENTION

1. Field of the Invention

The present invention relates to a support structure for a video appliance, and more particularly to an adjustable support structure for a video appliance which enables forward and backward movement in addition to the angle adjustment of the video appliance in upward, downward, left, and right directions.

2. Description of the Related Art

Conventionally, a support is provided with a video appliance such as a computer monitor, etc. for adjusting the appliance in upward, downward, left and right directions for a user's convenience.

FIGS. 1 to 3 illustrate a conventional monitor support structure in a video appliance. Referring to FIGS. 1 to 3, the conventional monitor support comprises a base 1 for supporting a monitor 5, a boss 1A projected upward from the base 1, a rotatable plate such as a spherically shaped rotatable plate 2, coupled between a lower portion of the monitor 5 and an upper portion of the base 1, for adjusting the monitor 5 to be rotatable in left, right, upward and downward directions, an elongated guide hole 2A, formed at a bottom surface of the rotatable plate 2, for receiving therein the boss 1A, a connecting section 3, inserted in the rotatable plate 2, for enabling the rotatable plate 2 to rotate, and a screw 4, inserted through the boss 1A of the base 1, for fastening the base 1, the rotatable plate 2 and the connecting section 3 together.

The reference numerals 6, 3A, 7 and 8 in the drawings denote a plurality of anti-skid rubber packings attached to the bottom surface of the base 1, a screw hole formed on the connecting section 3, a keyboard, and a desk, respectively.

The operation of the conventional monitor support as constructed above will now be explained with reference to FIGS. 1 to 3.

As shown in FIG. 1, the user adjusts the tilting angle "A" of the monitor in upward and downward directions according to his/her wish in a state that the keyboard 7 and the monitor 5 are positioned at an upper end of the desk 8. As shown in FIG. 2, the user also adjusts the rotating angle "B" of the monitor in left and right directions.

To adjust the tilting angles in left, right, upward and downward directions, as shown in FIG. 3, the boss 1A projected from the upper surface of the base 1 supporting the monitor 5 passes through the elongated guide hole 2A formed on the lower portion of the rotatable plate 2. The rotatable plate 2 coupled to the lower portion of the monitor 5 subsequently rotates in left and right directions around the boss 1A, and the elongated guide hole 2A moves upward and downward from the boss 1A, thereby adjusting the tilting angles of the monitor 5 in upward and downward directions.

The connecting section 3 inserted in the rotatable plate 2 fixes the monitor 5 onto the rotatable plate 2 by fastening the screw 4 with the boss 1A through the screw hole 3A. At this time, an upper surface of the base 1 is in slidable contact with the lower portion of the rotatable plate 2.

Since the monitor 5 assembled as described above is adjustable in left, right, forward and backward directions, it is possible to use the monitor 5 with its rotating and tilting angles properly adjusted.

The anti-skid rubber packings 7 attached to the bottom surface of the base 1 prevents fluctuation of the base 1 against the desk 8.

Although it is possible to adjust the rotating and tilting angles of the monitor according to the conventional support of a video appliance, it is impossible to adjust the distance between the user and the monitor according to the eye sight of the user. Accordingly, the user must submit himself/ herself to the inconvenience of shifting the position of his/her seat for a proper adjustment of the distance between the monitor and himself/herself. Also, the keyboard becomes a bar of limiting the working space while the user is performing tasks other than using a video appliance such as reading or arranging documents.

SUMMARY OF THE INVENTION

An object of the present invention is to solve the problems involved in the prior art, and to provide an adjustable support structure for a video appliance which enables a distance between the video appliance and the user to be adjusted in addition to the angle adjustment of the appliance in left, right, upward and downward directions.

Another object of the present invention is to provide an adjustable support structure for a video appliance which can prevent occupation of the working space by a keyboard when the video appliance is not in use.

To achieve the above objects, there is provided an adjustable support for a video appliance, comprising a supporting plate, a slidable plate attachable to the video appliance, the slidable plate having a lower portion in slidable contact with the supporting plate to allow movement of the slidable plate in forward and backward directions relative to the supporting plate, a rotatable plate, coupled to an upper portion of the slidable plate, for adjusting angles of the video appliance in left, right, upward and downward directions, a connecting part, inserted in the rotatable plate, for connecting the slidable plate to the rotatable plate, and a fastening part for fastening the slidable plate, the rotatable plate, and the connecting part together.

BRIEF DESCRIPTION OF THE DRAWINGS

The above objects, other features and advantages of the present invention will become more apparent by the following description of the embodiments thereof with reference to the accompanying wings, in which.

DETAILED DESCRIPTION OF THE PREFERRED EMBODIMENTS

Figure 1:
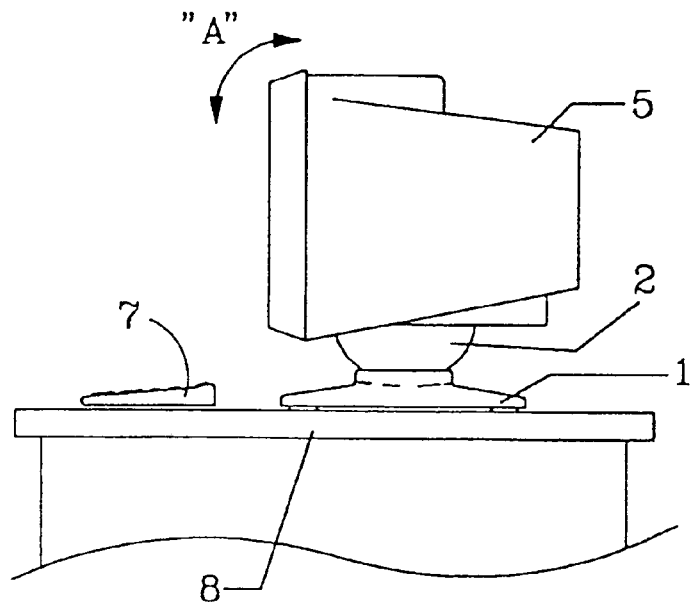
FIG. 1 is a side view of a conventional support for a video appliance in an installed state.
Figure 2:
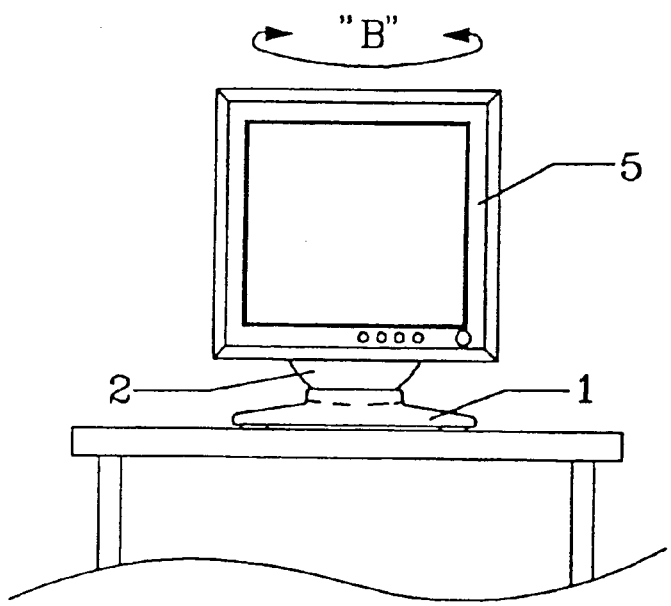
FIG. 2 is a front view of a conventional support for a video appliance in an installed state.
Figure 3:
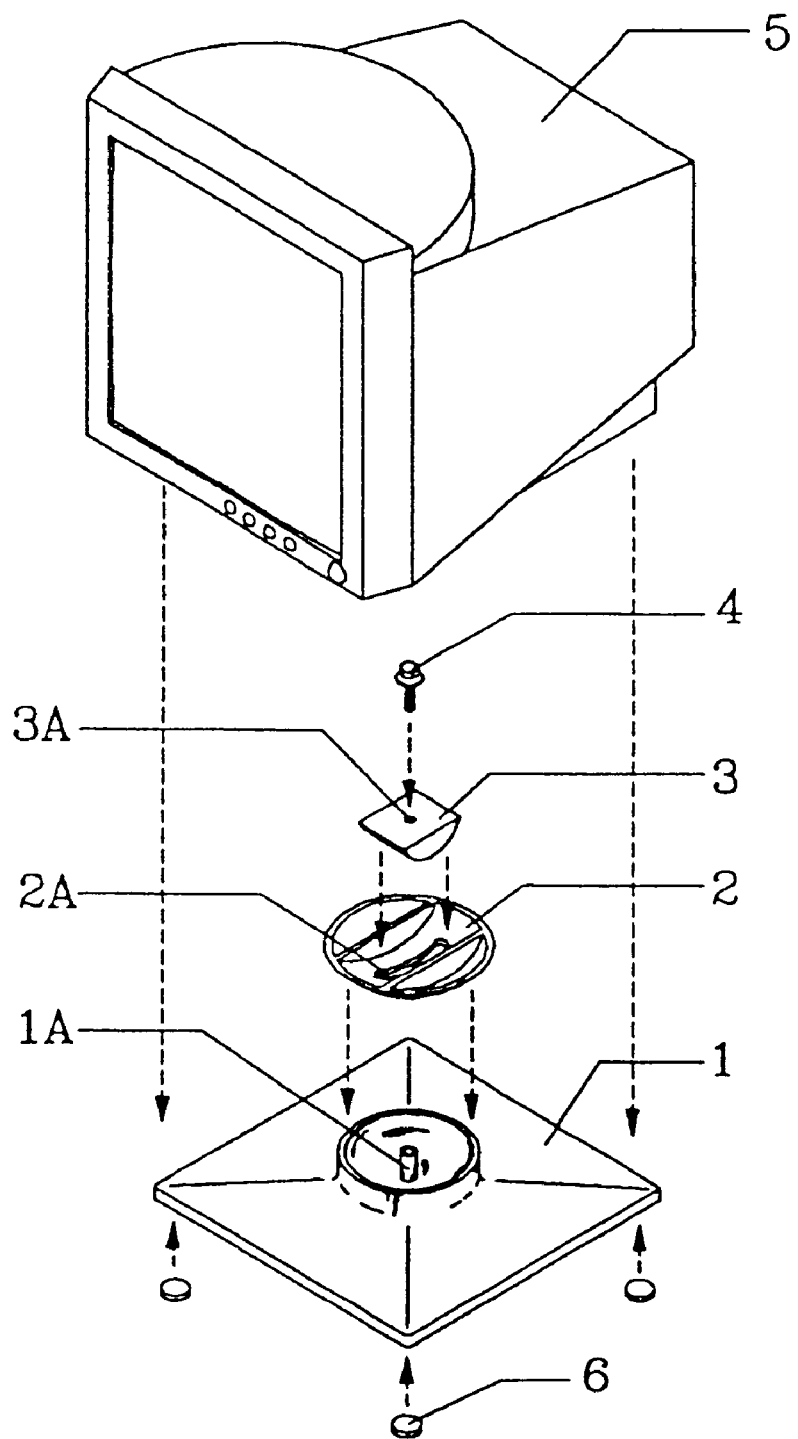
FIG. 3 is an exploded perspective view of a conventional support for a video appliance.

The adjustable support structure for a video appliance according to the present invention will now be explained with reference to FIGS. 4 to 8.

Referring to FIGS. 4 to 8, the adjustable support structure for a video appliance according to the present invention includes a slidable plate 12 which is slidable forward and backward together with a monitor 16, a supporting plate 11 engaged with the slidable plate 12 for guiding and supporting the sliding movement of the slidable plate 12, a rotatable plate 13 coupled to the upper portion of the slidable plate 12 for adjusting angles of the monitor 16 in left, right, upward and downward directions, a connecting part 14 inserted in the upper end of the rotatable plate 13 for connecting the slidable plate 12 to the rotatable plate 13, a screw 15 for fastening the slidable plate 12, the rotatable plate 13, and the connecting part 14 together, and a plurality of antiskid rubber packings 17 attached to a bottom surface of the supporting plate 11.

Figure 8:
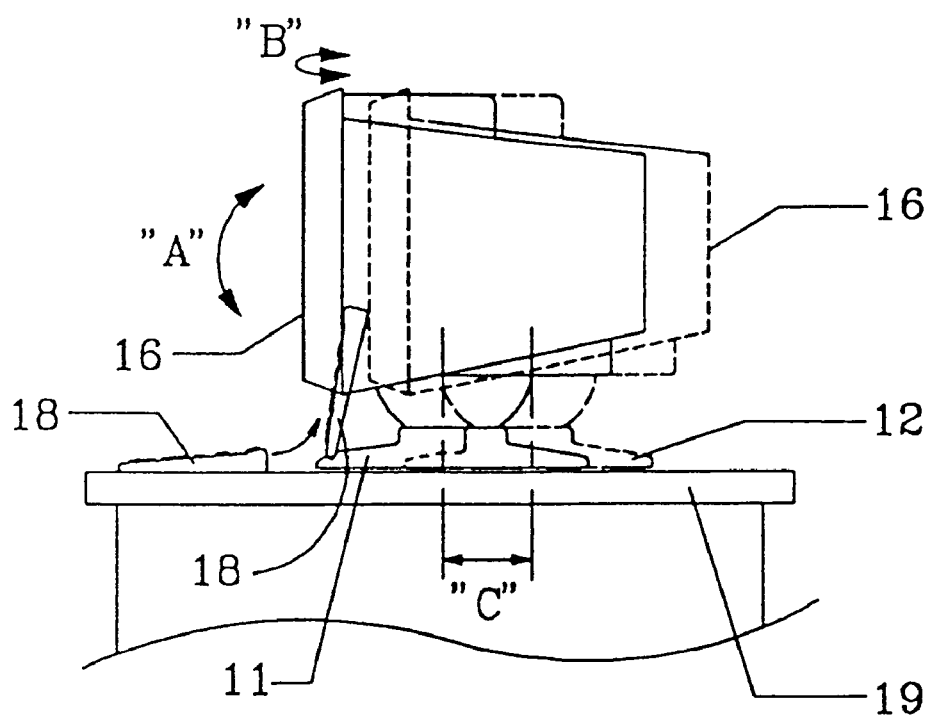
FIG. 8 is a side view of the adjustable support for a video appliance according to the present invention.

The supporting plate 11 has a keyboard groove 111 formed on an upper front portion of the supporting plate 11 so that the keyboard 18 can rest therein when it is not in use as shown in FIG. 8, a plurality of lugs 112, formed on both side walls of the supporting plate 11, for being engaged with the guide grooves 124 of the slidable plate 12 to guide and support the forward and backward movement of the slidable plate 12, a slidable bottom surface 113 for being in slidable contact with the bottom surface of the slidable plate 12, a stopper protrusion 114 formed on the slidable bottom surface 113 for limiting the backward movement of the slidable plate 12 within a predetermined distance, and a guide board 115 for guiding the horizontal movement of the slidable plate 12 so that the monitor 16 attached to the slidable plate does not move in a vertical direction as can happen when a user attempts to adjust the horizontal distance very quickly.

The slidable plate 12 comprises a boss 121 projected upward from the slidable plate 12, a front portion 122, formed on the front of the slidable plate 12, for guiding and supporting the forward and backward movement of the slidable plate 12 in cooperation with the guide board 115 of the supporting plate 11, a front passing groove 123, formed on the front of the slidable plate 12, for receiving therethrough the guide board 115 according to the forward movement of the slidable plate 12, guide grooves 124, formed on both sides of the slidable plate 12, for being engaged with the plurality of lugs 112 of the supporting plate 11 to guide and support the slidable plate 12, and a stopper rib 125, formed on the bottom surface of the slidable plate 12, for limiting the backward movement of the slidable plate 12 in cooperation with the stopper protrusion 114 of the supporting plate 11.

The numerals 13A, 14A, 18 and 19 denote an elongated guide hole, a screw-fastening hole, a keyboard, and a desk, respectively.

Operation of the adjustable support for a video appliance according to the present invention as constructed above will now be explained with reference to FIGS. 4 to 8.

Figure 4:
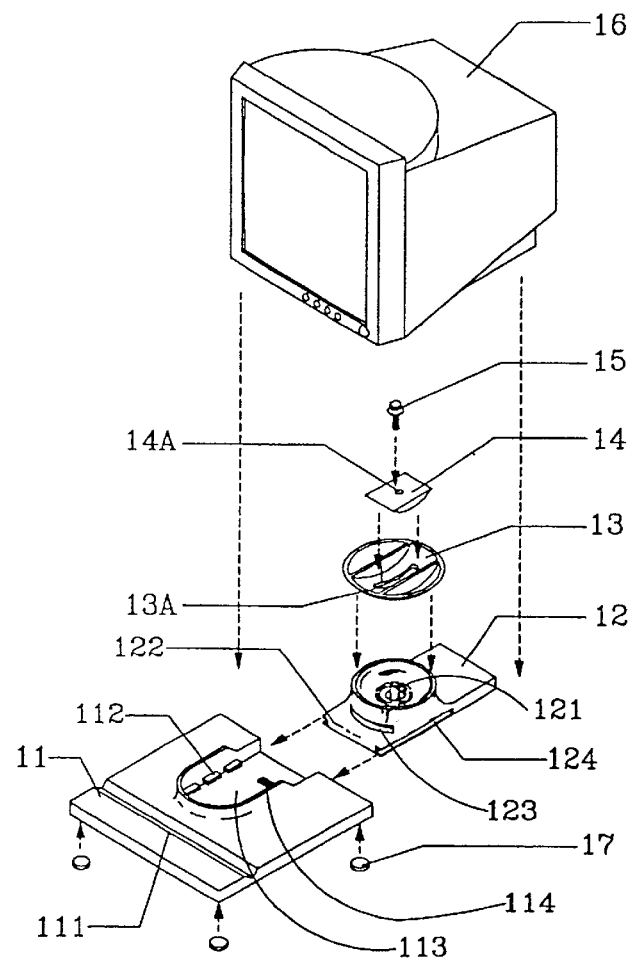
FIG. 4 is an exploded perspective view of an adjustable support for a video appliance according to the present invention.

As illustrated in FIG. 4, the plurality of anti-skid rubber packings 17 formed on the bottom surface of the supporting plate 11 prevents skidding of the supporting plate 11 from the desk 19.

If the slidable plate 12, which moves forward and backward together with the monitor 16 against the fixed supporting plate 11, is inserted along the slidable bottom surface 113 of the supporting plate 11, the stopper protrusion 114 formed on the slidable bottom surface 113 moves downward, enabling the front portion 122 of the slidable plate 12 to be inserted into the supporting plate 11.

The plurality of lugs 112 formed on both inner surfaces of the slidable bottom surface 113 of the supporting plate 11 are inserted into the guide grooves 124 of the slidable plate 12, resulting in that the supporting plate 11 is subsequently engaged with the slidable plate 12 according to the interlocking of the front section 122. When the slidable plate is fully retrieved into the supporting plate, the guide board 115 passes through the front passing groove 123 of the slidable plate 12.

After the supporting plate 11 is engaged with the slidable plate 12, the monitor 16, which is adjustable in left, right, upward and downward directions, is fixed to an upper portion of the slidable plate 12, which is slidable forward and backward from the supporting plate 11.

In other words, the rotatable plate 13 is placed on the slidable plate 12 so that the boss 121 projected upward of the slidable plate 12 can pass through the elongated guide hole 13A formed on the bottom surface of the rotatable plate 13.

The slidable plate 12 and the rotatable plate 13 are assembled with the connecting part 14 by fastening the screw 15 with the boss 121 through the screw-fastening hole 14A after inserting the connecting section 14 into the rotatable plate 13.

The monitor 16 is then fixed to the upper portion of the rotatable plate 13.

The monitor 16 is angle-adjustable in left, right, upward and downward directions. The monitor is also slidable forward and backward so that the distance between the user and the monitor can be adjusted.

In other words, the user can adjust the distance between the user and the monitor by moving the monitor 16 against the supporting plate 11 fixed on the desk 19 by means of the slidable plate 12 which is fixed to the monitor 16.

Figure 5:
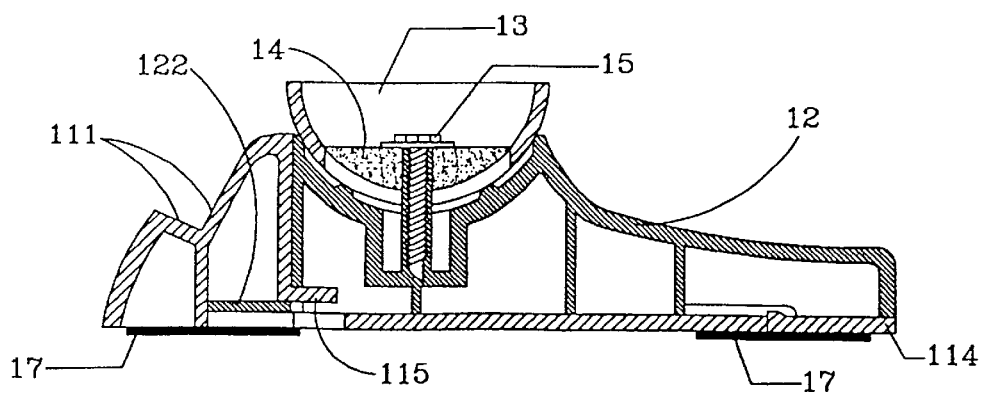
FIG. 5 is a longitudinally sectional view illustrating the slidable plate slided into the supporting part in an adjustable support for a video appliance according to the present invention.
Figure 6:
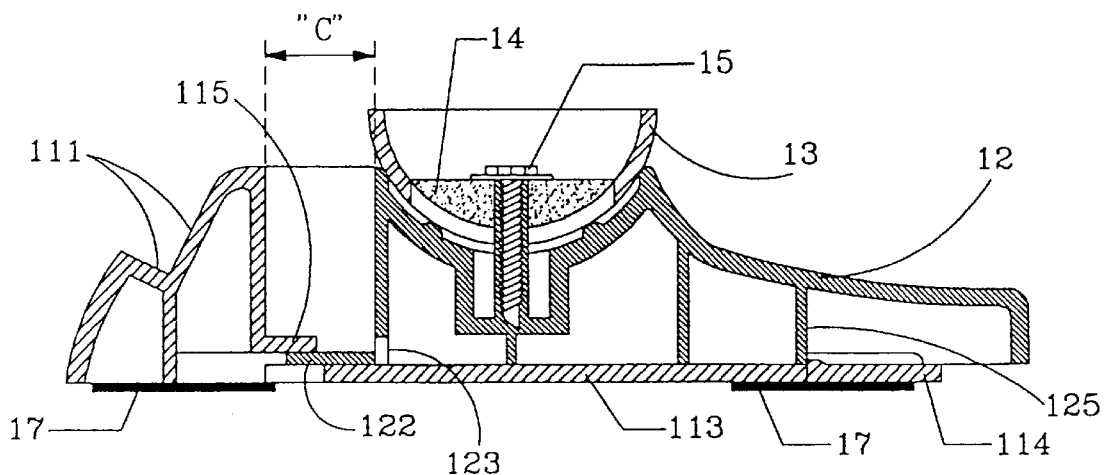
FIG. 6 is a longitudinally sectional view illustrating the slidable plate slided away from the supporting part in the adjustable support for a video appliance according to the present invention.

FIG. 5 shows an engaged state of the slidable plate 12 with the supporting plate 11 after being moved forward. If the user pushes the monitor 16 backward in that state, the slidable plate 12, which is fixed to the monitor 16, moves backward against the supporting plate 11 fixed on the desk 19 as shown in FIGS. 6 and 8.

Specifically, as the slidable plate 12 is pushed backward from the slidable bottom surface 113 of the supporting part 11, the guide groove 124 of the slidable plate 12 slides backward, being guided by the plurality of lugs 112 formed on both sides of the slidable bottom surface 113.

If the slidable plate 12 slides backward to the extent of a predetermined distance "C", the stopper rib 125 of the slidable plate 12 becomes in contact with the stopper protrusion 114 projected from the slidable surface 113. Thus, the slidable plate 12 cannot slide backward from the supporting part 11 farther than the predetermined distance "C".

Meanwhile, if the user pulls the monitor 16 to return the monitor 16 to an original position, the slidable plate 12 fixed to the monitor 16 moves forward along the slidable bottom surface 113 of the supporting plate 11.

Figure 7:
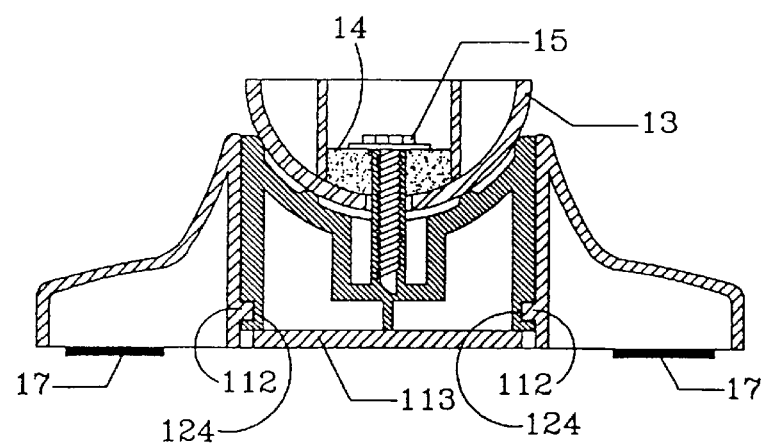
FIG. 7 is a cross-sectional view illustrating the supporting part and the slidable plate in the adjustable support for a video appliance according to the present invention.

In other words, the guide grooves 124 of the slidable plate 12 are guided along the lugs 112 formed on the inner surfaces of the supporting plate 11, and the front portion 122 of the slidable plate 12 slides downward from the guide board 115. Thereafter, the front passing groove 123 of the slidable plate 12 is interlocked with the guide board 115. FIG. 5 shows such a state. FIG. 7 is a cross-sectional view showing an engaged state of the slidable plate 12 with the supporting plate 11 as described above.

As shown in FIG. 8, the monitor 16 is moved forward and backward within the predetermined distance "C" according to the user's wish. It is also possible for the user to adjust the tilting angle ("A") and rotation of the monitor 16 ("B") in upward, downward, left and right directions.

As described above, the present invention provides the user with convenience of moving the video appliance forward and backward within a predetermined distance as well as an advantage of availing the space occupied by the keyboard for other working purposes when the keyboard is not in use.

What is claimed is:

1. An adjustable support structure for a video appliance, comprising:

a slidable plate having an upper portion for supporting the video appliance, and a lower portion having guide grooves formed on both sides of the lower portion; and a supporting plate having a center opening with a plurality of lugs formed on an inner side wall of the center opening;

wherein the plurality of lugs are engaged with the guide grooves of the slidable plate so that the slidable plate is movable in forward and backward directions within the center opening of the supporting plate.

2. The adjustable support structure of claim 1, wherein the supporting plate includes a keyboard groove for resting a keyboard of the video appliance.

3. An adjustable supporting structure for a video appliance, comprising:

a slidable plate having an upper portion for supporting the video appliance, and a lower portion having guide grooves formed on both sides of the lower portion; and a supporting plate having a center opening with a plurality of lugs formed on an inner side wall of the center opening, the lugs being engaged with the guide grooves of the slidable plate;

a rotatable plate, coupled to the upper portion of the slidable plate, for adjusting angles of the video appliance in left, right, upward and downward directions;

a connecting part, inserted in the rotatable plate, for connecting the slidable plate to the rotatable plate; and a fastening part for fastening the slidable plate, the rotatable plate, and the connecting part together.

4. The adjustable support structure of claim 3, wherein the fastening part comprises a fastening screw.

5. The adjustable support structure of claim 3, further comprising a plurality of anti-skid members attached to a bottom surface of the supporting plate.

6. The adjustable support structure of claim 3 wherein the supporting plate comprises:

a keyboard groove formed on the supporting part so that a keyboard of the video appliance can rest on the groove;

a slidable bottom surface in slidable contact with the slidable plate;

a stopper protrusion for limiting backward movement of the slidable plate within a predetermined distance; and a guide board for supporting a front portion of the slidable plate.

7. The adjustable support structure of claim 3, wherein the slidable plate comprises:

a boss projected upward from the slidable plate so as to pass through an elongated guide hole formed on the rotatable plate;

a front portion formed on a front of the slidable plate for supporting the movement of the slidable plate in cooperation with a guide board of the supporting plate;

a front passing groove, formed on the front of the slidable plate, for receiving therethrough the guide board of the supporting plate; and a stopper rib, formed on a bottom surface of the slidable plate, for limiting the backward movement of the slidable plate in association with a stopper protrusion formed on the supporting plate.

* * * * *